US010679256B2

(12) United States Patent
Irwin et al.

(10) Patent No.: US 10,679,256 B2
(45) Date of Patent: Jun. 9, 2020

(54) RELATING ACOUSTIC FEATURES TO MUSICOLOGICAL FEATURES FOR SELECTING AUDIO WITH SIMILAR MUSICAL CHARACTERISTICS

(71) Applicant: Pandora Media, Inc., Oakland, CA (US)

(72) Inventors: Christopher Irwin, Los Altos, CA (US); Shriram Bharath, Oakland, CA (US); Andrew J. Asman, Berkeley, CA (US)

(73) Assignee: Pandora Media, LLC, Oakland, CA (US)

( * ) Notice: Subject to any disclaimer, the term of this patent is extended or adjusted under 35 U.S.C. 154(b) by 652 days.

(21) Appl. No.: 14/750,022

(22) Filed: Jun. 25, 2015

(65) Prior Publication Data
US 2016/0379274 A1 Dec. 29, 2016

(51) Int. Cl.
*G06Q 30/00* (2012.01)
*G06Q 30/02* (2012.01)
*G06F 16/632* (2019.01)

(52) U.S. Cl.
CPC ....... *G06Q 30/0271* (2013.01); *G06F 16/634* (2019.01)

(58) Field of Classification Search
CPC .................................. G06Q 30/0207–30/0277
USPC .............................................. 705/14.1–14.73
See application file for complete search history.

(56) References Cited

U.S. PATENT DOCUMENTS

| 7,974,838 B1* | 7/2011 | Lukin | G10H 1/366 |
| | | | 704/207 |
| 2003/0221541 A1* | 12/2003 | Platt | G10H 1/0058 |
| | | | 84/609 |
| 2006/0065102 A1* | 3/2006 | Xu | G10H 1/0008 |
| | | | 84/600 |
| 2008/0091366 A1* | 4/2008 | Wang | H04H 20/14 |
| | | | 702/71 |

(Continued)

FOREIGN PATENT DOCUMENTS

JP 2007-018190 1/2007

OTHER PUBLICATIONS

PCT International Search Report and Written Opinion for PCT/US2016/037669, dated Oct. 12, 2016, 10 Pages.

*Primary Examiner* — Luis A Brown
*Assistant Examiner* — Allan J Woodworth, II
(74) *Attorney, Agent, or Firm* — Fenwick & West LLP

(57) ABSTRACT

A content server uses a form of artificial intelligence such as machine learning to identify audio content with musicological characteristics. The content server obtains an indication of a music item presented by a client device and obtains reference music features describing musicological characteristics of the music item. The content server identifies candidate audio content associated with candidate music features. The candidate music features are determined by analyzing acoustic features of the candidate audio content and mapping the acoustic features to music features according to a music feature model. Acoustic features quantify low-level properties of the candidate audio content. One of the candidate audio content items is selected according to comparisons between the candidate music features of the candidate audio advertisements and the reference music features of the music item. The selected audio content is provided the client device for presentation.

15 Claims, 8 Drawing Sheets

(56) References Cited

U.S. PATENT DOCUMENTS

| | | | |
|---|---|---|---|
| 2008/0109845 A1* | 5/2008 | Hengel | G06Q 30/02 725/36 |
| 2009/0216622 A1* | 8/2009 | Hoashi | G06F 17/30743 705/14.54 |
| 2009/0281906 A1* | 11/2009 | Cai | G06Q 10/06 705/26.1 |
| 2009/0292732 A1* | 11/2009 | Manolescu | G11B 27/105 |
| 2009/0306797 A1* | 12/2009 | Cox | G10H 1/0008 700/94 |
| 2010/0114345 A1 | 5/2010 | Olesti et al. | |
| 2011/0066438 A1* | 3/2011 | Lindahl | G10L 13/033 704/258 |
| 2012/0023403 A1* | 1/2012 | Herberger | G06F 16/639 715/716 |
| 2012/0072282 A1 | 3/2012 | Leigh et al. | |
| 2014/0121797 A1* | 5/2014 | Ales | G11B 20/10 700/94 |
| 2015/0262249 A1* | 9/2015 | Wical | G06Q 30/0269 705/14.55 |

* cited by examiner

RELATING ACOUSTIC FEATURES TO MUSICOLOGICAL FEATURES FOR SELECTING AUDIO WITH SIMILAR MUSICAL CHARACTERISTICS

BACKGROUND

1. Field of Art

The present invention generally relates to delivering audio content, and, more specifically, to using artificial intelligence for relating acoustic features and musicological features to enable selection of similar audio content.

2. Background of the Invention

A digital content server may earn revenue by inserting advertisements (also referred to as "ads" herein) into the digital content and receiving payment from advertisers in return. For example, a content server may insert audio ads between songs in an audio content stream provided to users. However, inserting ads into content may disrupt the user experience, causing some users to pay less attention to the provided content or to terminate the application delivering the content. When users terminate an application delivering content from the content server, the content server cannot provide ads and loses revenue. Accordingly, disruptions to the user experience reduce content server revenue.

The disruption to the user experience from ads is exacerbated when the content of an ad does not match the content provided before or after the advertisement. In traditional media, producers may manually select and sequence ads to improve coherency. However, in a personalized media distribution environment, manually sequencing ads may be infeasible because of the sheer number of personalized media channels. As a result, content servers providing a variety of content may present ads that are mismatched with surrounding content, which disrupts the user experience and consequently reduces content server revenue.

SUMMARY

In one embodiment, a computer-implemented method for selecting audio similar to music provided to a client device comprises the following steps. An indication of a reference music item presented by the client device is obtained. Reference music features describing musicological characteristics of the reference music item are obtained. Candidate audio advertisements are determined that are associated with candidate music features describing musicological characteristics of the candidate audio advertisements. An audio advertisement is selected from the candidate audio advertisements according to measures of similarity between the candidate music features of the candidate audio advertisements and the reference music features of the reference music item. The selected audio advertisement is provided to the client device for presentation after the reference music item.

In one embodiment, a system for selecting audio similar to music provided to a client device comprises a processor and a computer-readable storage medium comprising instructions executable by the processor. The instructions comprise instructions for performing the following steps. In one embodiment, a computer-implemented method for selecting audio similar to music provided to a client device comprises the following steps. An indication of a reference music item presented by the client device is obtained. Reference music features describing musicological characteristics of the reference music item are obtained. Candidate audio advertisements are determined that are associated with candidate music features describing musicological characteristics of the candidate audio advertisements. An audio advertisement is selected from the candidate audio advertisements according to measures of similarity between the candidate music features of the candidate audio advertisements and the reference music features of the reference music item. The selected audio advertisement is provided to the client device for presentation after the reference music item.

In one embodiment, a computer-readable storage medium comprises computer program instructions for selecting audio advertisement similar to music provided to a client device. The instructions are executable by a processor. The instructions comprise instructions for performing the following steps. In one embodiment, a computer-implemented method for selecting audio similar to music provided to a client device comprises the following steps. An indication of a reference music item presented by the client device is obtained. Reference music features describing musicological characteristics of the reference music item are obtained. Candidate audio advertisements are determined that are associated with candidate music features describing musicological characteristics of the candidate audio advertisements. An audio advertisement is selected from the candidate audio advertisements according to measures of similarity between the candidate music features of the candidate audio advertisements and the reference music features of the reference music item. The selected audio advertisement is provided to the client device for presentation after the reference music item.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
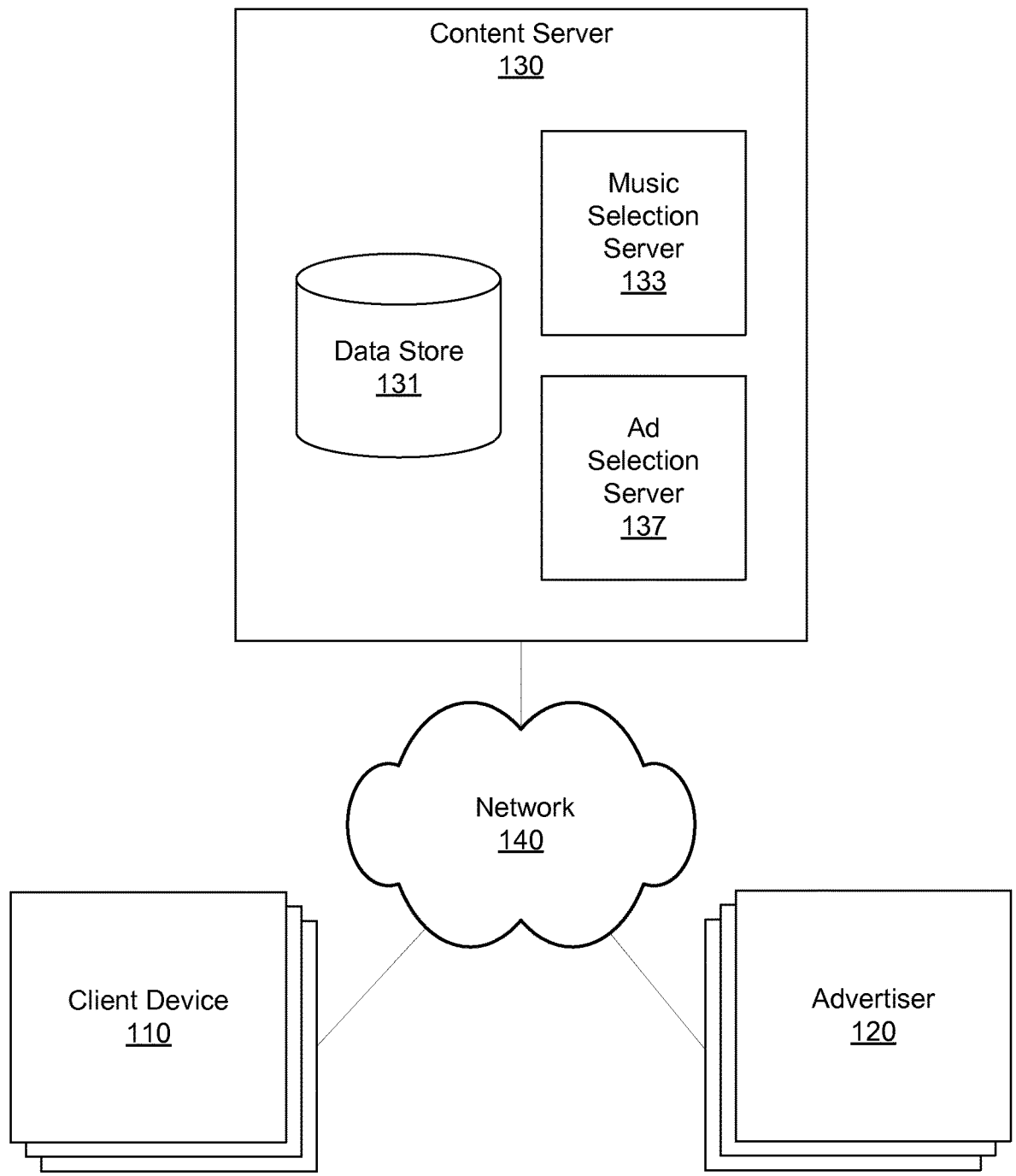
FIG. 1 illustrates a computing environment for generating personalized audio advertisements, according to an embodiment.

FIG. 1 illustrates a computing environment for generating personalized audio advertisements, according to an embodiment. The environment includes entities such as client devices 110, advertisers 120, and a content server 130.

The client devices 110 are computing devices such as smartphones with an operating system such as ANDROID or APPLE IOS, tablet computers, laptop computers, desktop computers, electronic stereos in automobiles or other vehicles, or any other type of network-enabled device that plays digital content. Typical client devices 110 include hardware and software to output sound (e.g., speakers and microphone), connect to the network 140 (e.g., via Wi-Fi and/or 3G or other wireless telecommunication standards), and receive user inputs to select audio content.

The client devices 110 may have an application that allows interaction with the content server 130. For example, the application could be a browser that allows a user of the client device 110 to obtain content by browsing a web application provided by the content server 130. As another example, the application could be an application native to the operating system of the client device 110 and designed to enable interactions with the content server 130 and its content. In addition to allowing a user to obtain content from the content server 130, the application may also provide the content server 130 with data about the status and use of the client device 110, such as its network identifier and geographic location. In some embodiments, the user of the application may elect to disable this feature.

The application on a particular client device 110 may be associated with a user of the client device 110 (e.g., via a one-time registration, or a username and password pair or other credentials). When the application is associated with a user, the application can store or otherwise gain access to user information such as user profile data (e.g., interests, demographics, content preferences, location). User information may be expressly provided through the application to configure a user profile on the content server 130. The client device 110 is described in further detail with respect to FIG. 2.

In general, the content server 130 provides audio content, such as songs, pieces of music, or audio recordings. Audio content (also referred to as "audio") refers to any media with an audio component, including stand-alone audio as well as videos, images, animations, and text associated with an audio component. Audio content may be represented in digital form (e.g., intensity values for a series of samples), encrypted or compressed digital form, analog form, or any other suitable format. In one embodiment, the content server 130 provides streamed audio content, but the content server 130 may alternatively or additionally provide files comprising audio content. In one particular embodiment referred to throughout the specification, the content server 130 provides streamed audio. Subsequent references to "playing," "listening," or other audio-related terminology could equally apply to (for example) a client device 110 presenting other media from the content server 130 for a user to experience.

The content server 130 provides audio advertisements (also referred to as "audio ads"), which may be interspersed between, or incorporated into, non-advertisement audio content. An audio ad is a marketing communication delivered on behalf of an advertiser 120. For example, the content server 130 provides a stream of audio content including audio ads interspersed between songs.

Advertisers 120 are entities that provide the content server 130 with advertisement information used to produce audio advertisements played through client devices 110. As used herein, advertiser 120 refers to entities that create advertisements as well as to the systems used to communicate with the content system 130 (e.g., computers). Advertisement information provided by advertisers 120 includes an audio advertisement, targeting criteria, other advertisement preferences (e.g., budget, bid price), or a combination thereof. Advertisers 120 typically provide audio ads as audio files, but advertisers may also provide audio ads as a specification of non-audio components (e.g., text for conversion to speech, identifying information for background music) from which that the content server 130 generates an audio ad. Targeting criteria indicate characteristics of users to receive an audio ad, including characteristics of musical content in music streams to contain the audio ad.

The content server 130 receives advertisement information including audio ads from the advertisers 120. The content server 130 associates the audio ads with music features representing musicological characteristics of the audio ad (e.g., musical genre, instruments, emotional tone). To determine the music features associated with an audio ad, the content server 130 determines acoustic features quantitatively describing the audio ad and maps those acoustic features to corresponding music features. When selecting an audio ad for presentation through a client device 110, the content server 130 determines a measure of similarity between music features of music played by the client device 110 and music features associated with several audio ads. The content server 130 selects the audio ad according to the determined measure of similarity and provides the selected audio ad to the client device 110 for presentation. For example, the content server 130 selects an audio ad according to a measure of similarity with content played immediately before the audio ad. Selecting audio ads according to the measure of similarity beneficially improves consistency of audio ads with other content provided to the user, which improves user engagement.

The client devices 110, the advertisers 120, and the content server 130 are connected via a network 140. The network 140 may be any suitable communications network for data transmission. The network 140 uses standard communications technologies and/or protocols and can include the Internet. In another embodiment, the network 140 includes custom and/or dedicated data communications technologies.

Content Server

The components of the content server 130 include a data store 131, a music selection server 133, and an ad selection server 137. The components of the content server 130 are not necessarily implemented on any one device or group of co-located devices. For example, the content server 130 may include a content distribution network that supplies music from geographically data stores 131. Some components of the content server 130 may be controlled by a third-party entity; for example, the function of the ad selection server 137 is provided in whole or in part by an advertisement exchange. Any of the functions performed by the ad selection server 137 according to the following description may also be performed by the music selection server 133 working alone or in combination with the ad selection server 137.

The data store 131 stores music content, music metadata, ad content, and ad information. Music content (also referred to as "music") is audio representing sounds arranged to evoke beauty or emotion, typically through rhythm, melody, or harmony. Music metadata includes bibliographic information (e.g., artist, composer, album title, track name, track number, release date, record label, genre) and associated music features that characterize the associated audio content. A music feature describes musicological characteristics of media items. For example, music features of a song may indicate the underlying characteristics of the song, such as the gender of the singer, the type of background vocals, the tempo, the quality of the tones (e.g., pure or distorted), whether the melody dominates the composition, or related musical influences. A given song, audio ad, or other unit of audio content may have many (e.g., 100-500) music features. In one embodiment, the association between music and music features is provided by the MUSIC GENOME PROJECT database created by PANDORA MEDIA, INC. of Oakland, Calif.

In addition to music content and associated music metadata, the data store 131 contains ad content and other ad information. In addition to the ad information (e.g., targeting criteria, advertisement preferences) received from the advertisers 120, the data store 131 may contain ad information obtained by the content server 130. In particular, the content server 130 may determine music features associated with an audio ad and store them as part of the audio ad's associated ad information. Determination of music features for audio ads is described in further detail with respect to FIGS. 4 and 7. Additionally, the content server 130 may gather feedback information summarizing feedback from client devices 110 that present the audio ad, as described in further detail with respect to FIG. 3.

The music selection server 133 provides music to a requesting client device 110. If the content server 130 provides streaming audio, for example, then the music selection server 133 selects audio content and streams the selected audio to the client device 110 over time. The music selection server 133 may select music for a user based at least in part on user information (e.g., user preferences), user requests, user feedback, or a combination thereof.

In one embodiment, the music selection server 133 generates content playlists and selects audio content from the content playlists based on a seed characteristic received from a user. A seed characteristic describes one or more attributes of the content playlist that the user would like formed. Seed characteristics may specify bibliographic information of audio content (e.g., track title, band name, album title, release year) or any term to describe music (e.g., musical genre, historical era, a music feature). The music selection server 133 extracts music features from the seed characteristic using a mapping between audio content associated with the seed characteristic and corresponding music features in the data store 131. If the seed characteristic does not describe a single item of audio content, the music selection server 133 retrieves one or more items audio content associated with the seed characteristic. For example, the music selection server 133 retrieves one or more representative songs (e.g., of a genre, of a band). The music selection server 133 uses the extracted music features to dynamically generate a content playlist of audio content having music features similar to the extracted music features. For example, given a seed characteristic of a band X, the music selection server 133 locates a song Y by band X and identifies music features that characterize the song Y.

The ad selection server 137 selects audio ads for presentation to a user of a client device 110 receiving audio content. The application on the client device 110 may request audio ads to present between items of audio content. For example, the application queries the ad selection server 137, which selects an audio ad and provides it to the client device 110. As another example, the ad selection server 137 pre-selects audio ads to accompany audio content selected for the client device 110. The audio ad is selected according to similarity of the ad's associated music features with music features of music playing before or after the ad. The client device 110 receives and plays the audio ad selected by the ad selection server. The ad selection server 137 may also select non-audio advertisements to deliver to the client device 110 (e.g., interactive visual content, animations, images). The ad selection server 137 is described in further detail with respect to FIG. 3.

Client Device

Figure 2:
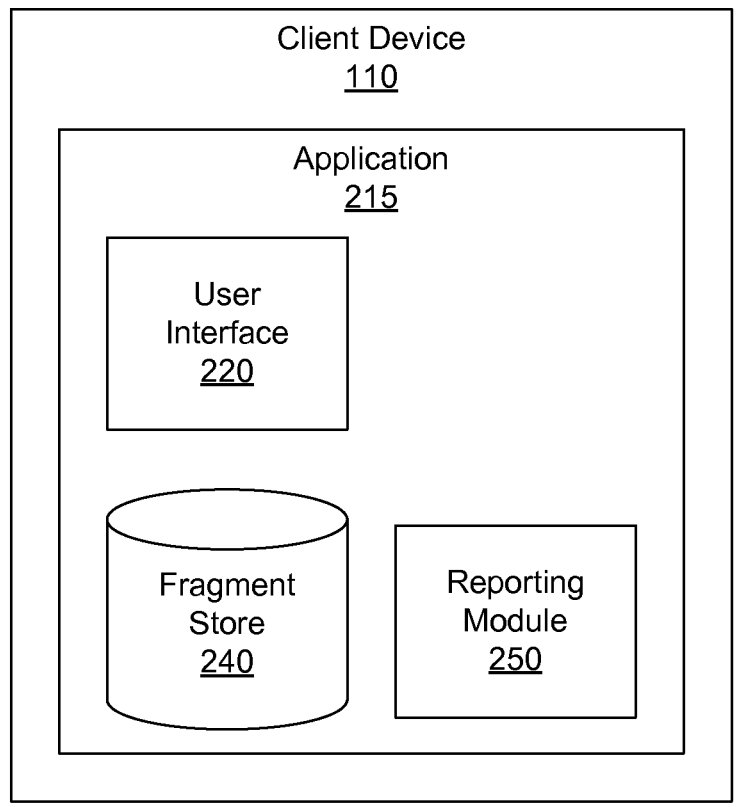
FIG. 2 is a high-level block diagram illustrating a detailed view of a client device, according to an embodiment.

FIG. 2 is a high-level block diagram illustrating a detailed view of a client device 110, according to an embodiment. The client 110 includes application 215, which includes a user interface 220, a fragment store 240, and a reporting module 250.

The user interface 220 facilitates interaction between the user and the content server 130. For example, the application 215 provides a graphical user interface for interacting with an audio stream. An example user interface 220 displays bibliographic information about a currently playing or previously played song and may also include a video, animation, or image ad from the ad selection server 137. The user interface 220 may also provide playback controls (e.g., pause, skip, play) and feedback controls (e.g., like, dislike, favorite, rate, share, bookmark) to indicate the user's positive, negative, or indifferent reaction to a song. In one embodiment, a user may request a playlist through the user interface 220 by providing a seed characteristic used by the music selection server 133 to generate a content playlist.

The fragment store 240 stores audio content received from the audio server 130 to be played by the content device 110. In one embodiment, the content server 130 provides a content fragments comprising a number of audio content items (e.g., four songs) and/or audio ads. The music selection server 133 may select related audio content for use in a content fragment. For example, a content fragment contains songs and audio ads having similar music features, so the user experiences smoother transitions between songs. Content fragments may include slots for advertisements (e.g., zero to two slots). A slot for an advertisement provides instructions for retrieving one or more audio advertisements from the content server 130 for playback through the client device 110. Alternatively or additionally, the stored content fragment includes the content of one or more audio advertisements selected for presentation after one or more songs in the fragment.

The reporting module 250 transmits usage data to the content server 130. Usage data includes feedback received through the user interface 220. Feedback includes explicit feedback (from a feedback control in the user interface 220) and implicit feedback (e.g., skipping a song, pausing a song, sharing a song). The reporting module 250 may also query an operating system of the client device 110 to collect feedback information indicating whether a user is listening to presented content. For example, the reporting module 250 identifies changes in audio volume or changes in playback device connectivity (e.g., physical disconnection, selection of a different audio or visual output device). The reporting module 250 also records and reports when a user exits or otherwise terminates the application 215. Since some playback controls within the application 215 may be disabled during audio ads, user commands to the operating system of the client device 110 improve feedback information.

The reporting module 250 transmits feedback reports to the content server 130. Feedback reports identify the feedback action and the triggering audio content. For example, when a user terminates the application 215 during an audio ad, the reporting module 250 reports the audio ad as the audio content triggering the negative user disengagement from the application. The content server 130 may select ads and music based at least in part on the feedback reports and other usage data. For example, the content server 130 treats a termination of the application 215 as stronger negative feedback than muting in selecting audio ads.

Ad Selection Server

Figure 3:
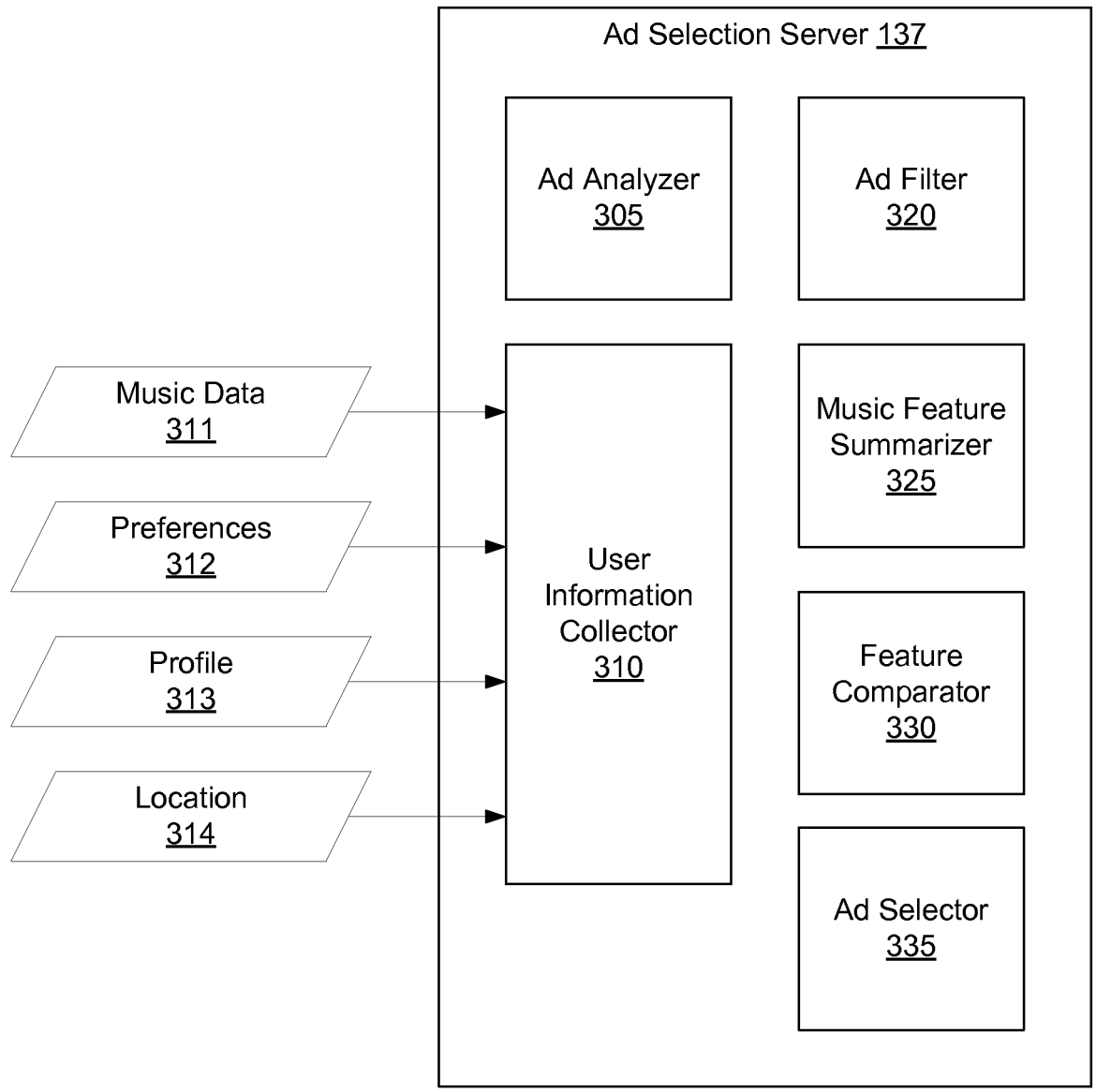
FIG. 3 is a high-level block diagram illustrating a detailed view of an ad selection server, according to an embodiment.

FIG. 3 is a high-level block diagram illustrating a detailed view of ad selection server 137, according to an embodiment. The ad selection server 137 includes an ad analyzer 305, a user information collector 310, an ad filter 320, a music feature summarizer 325, a feature comparator 330, and an ad selector 335. Some embodiments of the ad selection server 137 have different modules than those described here or may distribute functions in a different manner than that described here.

The ad analyzer 305 obtains an audio ad from an advertiser 120 and associates the audio ad with music features. To determine the music features, the ad analyzer 305 determines quantitative acoustic features summarizing the audio ad. These acoustic features are mapped to music features according to a music feature model. In one embodiment, the music feature model is a machine learning model including one or more classifiers to determine whether an audio ad is associated with a particular music feature according to the acoustic features of the audio ad. The music feature model depends on parameters, which are trained according to training data (e.g., audio content already associated with music features). Using the music features determined from the music feature model, the ad selector 335 selects audio ads similar to other music played at a client device 110. The ad analyzer 305 is described further with respect to FIG. 4.

Advertisers 120 often create audio ads by combining a voiceover track (e.g., vocals, sound effects) with background music. The ad analyzer 305 may determine music features of the audio advertisement from audio features of the combined audio ad received from the advertiser 120. Alternatively or additionally, the ad analyzer 305 separates the received audio ad into background music and voiceover and determines music features for either or both of these components. For example, the ad analyzer 305 may determine background music of an audio ad by comparing a fingerprint (or other condensed summary) of the audio ad with a database of music (e.g., the data store 131). The ad analyzer may isolate the voiceover component by comparing the audio ad with the identified background music (e.g., by temporally aligning the identified background music and audio ad and subtracting to generate an approximation of the voiceover component). Determining music features for the audio ad as a whole beneficially provides composite music features of the audio ad even if the audio ad does not contain background music (or the background music is not identified), but separating the audio ad into two or more components may provide more fine-grained music feature information.

The user information collector 310 retrieves user information received or otherwise obtained by the content server 130. In response to the user information, the ad filter 320 and ad selector 335 determine audio ads for presentation through the client device 110. In one embodiment, the user information collector 310 retrieves user information such as music data 311, Profile data 313, preference data 312, and location data 314.

Music data 311 describes content provided to a client device 110 associated with a user. Music data 311 include historical content as well as content currently playing on the client device 110 (e.g., obtained from the reporting module 250, inferred based on the content fragment transmitted to the client device 110). The user information collector 310 determines music data 311 describing the music content presented to a client device 110 temporally proximate to an advertisement selected by the ad selector 335. Temporally proximate refers to music content presented within one to three songs of an audio ad. In particular, music data 311 describing the song played immediately before an audio ad provides a psychological reference point for the subsequent audio ad to match. Music data 311 may include other music content that the client device 110 has requested or been provided (e.g., music content corresponding to requested seed characteristics). Music data 311 includes both bibliographic information (i.e., information used to catalogue audio content such as artist, album, producer, release date) and music features of the relevant music content.

The preference data 312 includes content preferences as well as ad preferences. Content preferences refer to user inclinations towards audio content and may be quantified with respect to a particular item of bibliographic information about music content (e.g., track title, artist, album, genre) or music features (e.g., from the MUSIC GENOME PROJECT database). Ad preferences may be quantified with respect to a particular product, a particular brand, a particular advertisement, or a particular component of an advertisement (e.g., the background music, the voiceover).

Content preferences may be received from the user (e.g., as part of a user profile) or inferred from user activity including explicit feedback (from feedback buttons on the user interface 220), implicit feedback (e.g., shares, skips, terminating the application 215, reducing or muting audio on the client device 110), and logged user activity (e.g., songs provided through the content server 130). For example, if a user provides positive feedback toward audio content (e.g., listening to the entirety of a song), then the user's preference data 312 is modified to indicate a greater inclination to the audio content's music features and bibliographic information. As another example, if a user provides positive feedback to an audio ad (e.g., selects a visual advertisement accompanying the audio ad), then the user's preference data 312 is modified to indicate a greater inclination to music features associated with the audio ad.

Profile data 313 includes attributes of a user that is provided by the user or otherwise obtained. For example, the Profile data 313 includes the user's name or inferred social role (e.g., occupation, class, marital status). Such Profile data 313 includes a user's preferred language, which the ad selector 335 uses to select an advertisement in the user's language. In addition, the Profile data 313 may include demographics (e.g., age, gender, socioeconomic status, education) and interests (e.g., politics, leisure activities, hobbies), or other user information included in advertiser targeting criteria.

Location data 314 describes a location associated with the user or with the client device 110. Location data 314 includes relatively precise data such as geographic coordinates (e.g., associated with a connectivity access point such as an internet protocol address or media access control address) or an address (e.g., a past or present residential address or billing address from the user's user profile).

Location data 314 also includes less precise data indicating a general geographic region (e.g., postal code, municipal area, city, town, neighborhood, country, state, county). Location data 314 may vary as the client device 110 (e.g., a smartphone) changes location.

In response to a request for an advertisement, the ad filter 320 identifies candidate audio ads having targeting criteria met by the client device 110 associated with the request for an advertisement. The request for an advertisement may be generated by the music selection server 133 in association with a fragment of one or more songs for delivery to a client device 110. The request for an advertisement may also be received from the application 215 on the client device 110 in response to an impending opportunity to present ads (e.g., a pre-designated slot in a fragment of songs). The ad filter 320 compares targeting criteria of the audio ads with user information of the ad request's corresponding client device 110. Targeting criteria are specified by advertisers 120 and delineate the user information of users eligible to receive the audio ad. For example, an audio ad's targeting criteria specify one or more eligible locations, musical characteristics (e.g., artist, genre), and profile data of users eligible to receive the advertisement. The ad filter 320 returns a set of candidate audio ads that the client device 110 making an ad request is eligible to receive according to the client device's associated user information.

The music feature summarizer 325 receives audio content (e.g., a song, an audio ad) and generates a coordinate representing music features present in the song. The music feature summarizer 325 obtains the music features associated with an audio ad as determined by the ad analyzer 305. For songs and other audio content, the music feature summarizer 325 retrieves the music features associated with the audio content from the data store 131 (e.g., the MUSIC GENOME PROJECT database). The music feature summarizer 325 generates a coordinate, vector, or other symbolic representation of the obtained music features. For example, the coordinate includes binary entries each indicating whether the audio content is associated with a particular music feature. The coordinate quantifies the music features present in audio content to facilitate comparisons to other audio content. In one embodiment, the music feature summarizer 325 generates a reference coordinate representing music features of reference audio content. For example, the reference audio content is the song played immediately before the as-yet unselected audio ad. The music feature summarizer 325 also generates a plurality of candidate coordinates representing respective music features of the candidate audio ads identified by the ad filter 320.

The feature comparator 330 takes as input a candidate coordinate of a candidate audio ad and a reference coordinate of reference audio content and outputs a measure of similarity between the candidate coordinate and the reference coordinate. The measure of similarity indicates similarity between music features of the candidate audio ad and the reference audio content. In one embodiment, the measure of similarity is based on a distance between the candidate coordinate and the reference coordinate. For example, the distance is a Euclidean distance (L2 norm) or a Manhattan distance (L1 norm) between the candidate coordinate and the reference coordinate. As the distance increases, the measure of similarity decreases. For example, two songs with many matching music features have a low distance between their corresponding coordinates and accordingly have a high measure of similarity. Alternatively or additionally, the candidate coordinate and reference coordinate are treated as vectors, and the measure of similarity is the cosine similarity between them.

The feature comparator 330 may also determine the measure of similarity is a weighted combination where each music feature (e.g., each dimension of the coordinates) has separate weight. For example, the measure of similarity is an inner product (e.g., dot product) between a vector of weights and a vector indicating features in common between candidate coordinate and reference coordinate. To increase computational efficiency, music features may be omitted from a measure of similarity by setting a corresponding weight of the music feature to zero. The weights corresponding to the music features may be determined in part based on a dimensionality reduction process (e.g., principal component analysis (PCA)). Such dimensionality reduction alternatively or additionally occurs while generating the candidate and reference coordinates representing the music features of the audio ads and reference audio content. The weights used in the combination may be updated in part based on feedback data, as described further with respect to FIG. 4.

The ad selector 335 obtains candidate audio ads identified by the ad filter 320 and selects one or more of the candidate audio ads to provide to the client device 110. To do so, the ad selector 335 uses measures of similarity that the feature comparator 330 determines between music features of the reference audio content and the respective candidate audio ads. In one embodiment, the ad selector 335 determines scores for the candidate audio ads and, ranks the audio ads by the scores, and selects one or more of the audio ads for presentation. The candidate ad score may be the measure of similarity itself or may incorporate other component scores indicating that the user of the client device 110 is likely to interact with the audio ad. Other component scores for a candidate audio ad may be based on matches between preferences indicated by the advertiser 120 and user information associated with the client device 110. For example, the ad selector 335 compares a user's location data 314, demographics (from the profile data 313), and interests (from the profile data 313) with corresponding user characteristics requested by the advertiser 120 (but not indicated as filter criteria). Relative weighting of different components of the candidate ad score may reflect preferences of the advertiser 120 or usefulness of a component for predicting the audio ad's effectiveness, as determined from feedback.

The ad selector 335 may determine a portion of the candidate ad score to reflect a user's preferences toward music features associated with the audio music ad. Negative feedback toward audio content having music features associated with an audio ad decreases the candidate ad score, and positive feedback toward audio content having music features associated with an audio ad increases the candidate ad score. The candidate ad score may depend on a feedback score that aggregates feedback events directed at particular items of audio content. A feedback event's contribution to the feedback score may be a combination of (a) a weight associated with a type of the feedback and (b) a measure of similarity between music features of the audio ad and music features of the audio content subject to the feedback. The weight may have a sign corresponding to whether the feedback is positive or negative and a magnitude indicating the relative importance of the type of feedback. For example, feedback data indicating that a user has terminated the application 215 has a greater magnitude than explicit feedback, which has a greater magnitude than other implicit feedback. Accordingly, the ad selector 335 may use music features inferred for an audio ad to predict a user's preferences toward the audio ad based on user feedback to previous audio ads and other audio content.

Ad Analyzer Module

Figure 4:
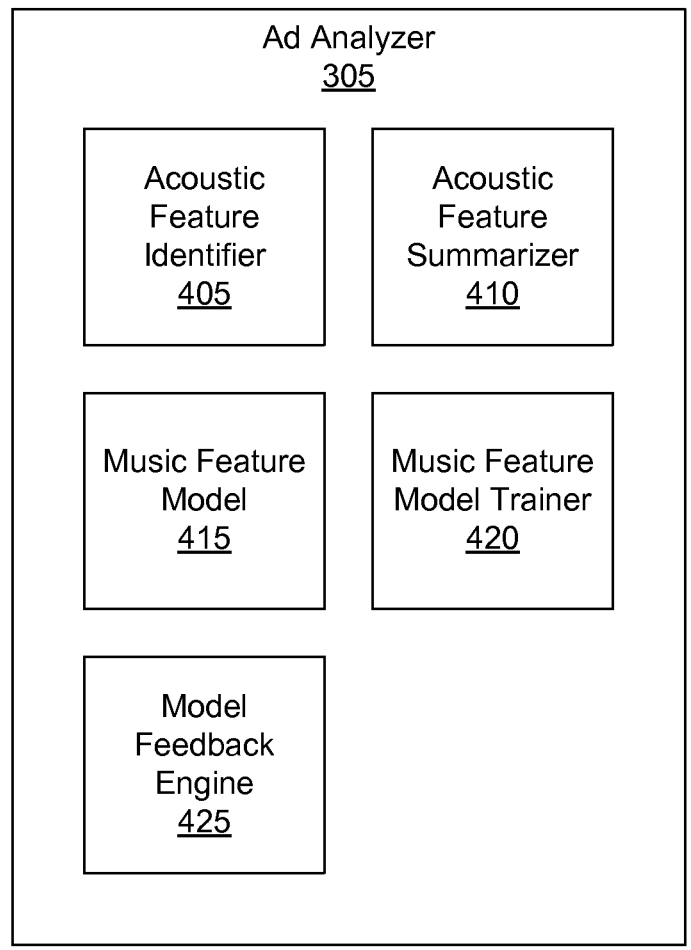
FIG. 4 is a high-level block diagram illustrating a detailed view of an ad analyzer, according to an embodiment.

FIG. 4 is a high-level block diagram illustrating a detailed view of an ad analyzer 305, according to an embodiment. The ad analyzer 305 includes an acoustic feature identifier 405, an acoustic feature summarizer 410, a music feature model 415, a music feature model trainer 420, and a model feedback engine 425. Some embodiments of the ad analyzer 305 have different modules than those described here or may distribute functions in a different manner than that described here.

The acoustic feature identifier 405 receives audio content (e.g., an audio ad) and determines acoustic features quantitatively describing the audio content. The acoustic feature identifier 405 analyzes the raw audio content to extract acoustic characteristics of the audio content. The acoustic feature identifier 405 may apply one or more Fourier transforms, discrete cosine transforms (DCT), or other transforms to identify periodic functions (e.g., sine waves at a given frequency) in the audio content or portions thereof. For example, the spectrums resulting from a Fourier transform are acoustic features that describe the relative strength of tones or pitches within the audio content. As another example, the acoustic feature identifier 405 applies an autocorrelation function to the series of samples. The resulting coefficients may indicate tempo or meter of audio content, with the stronger autocorrelation coefficients corresponding to the stronger periods of temporal repetition. The acoustic feature identifier 405 may apply a series of transforms to determine audio features. For example, the acoustic feature identifier 405 determines the mel-frequency cepstrum coefficients (MFCCs) of the audio content by applying a DCT to an audio content item's mel-scaled log power frequency spectrum (determined from the Fourier transform). The MFCCs provide a profile of timbres within the audio content.

Taking the acoustic features as input, the acoustic feature summarizer 410 generates acoustic feature coordinates representing the acoustic features. An acoustic feature coordinate may have entries indicating values for particular acoustic features, or the acoustic feature coordinate may be a vector or other representation of audio content's acoustic feature. In some embodiments, the acoustic feature summarizer 410 applies a dimensionality reduction (e.g., PCA) by combining correlated acoustic features into one or more condensed acoustic features. In such an embodiment, the acoustic feature summarizer 410 outputs a dimensionally reduced acoustic feature coordinate in place of the initial acoustic feature coordinate, beneficially reducing computational time for the music feature model 415.

The music feature model 415 takes as input an acoustic feature coordinate for audio content and outputs music features associated with the audio content. The music feature model 415 may include one or more artificial intelligence models, classifiers, or machine learning models to determine which music features are associated with the audio content. The music feature model 415 may include one or more logistic classifiers, decision trees, neural networks, deep learning models, or any combination thereof. The music feature model 415 includes model parameters that determine the mapping from the acoustic feature coordinate to music features. For example, model parameters of a logistic classifier include the coefficients of the logistic function that correspond to different acoustic features.

As another example, the music feature model 415 includes a decision tree model, which is a directed acyclic graph where nodes correspond to conditional tests for an acoustic feature and leaves correspond to classification outcomes (i.e., presence or absence of one or more music features). The parameters of the example decision tree include (1) an adjacency matrix describing the connections between nodes and leaves of the decision tree; (2) node parameters indicating a compared acoustic feature, a comparison threshold, and a type of comparison (e.g., greater than, equal to, less than) for a node; and/or (3) leaf parameters indicating which music features correspond to which leaves of the decision tree.

As a third example, the music feature model 415 includes model parameters indicating how to combine results from two separate models (e.g., a decision tree and a logistic classifier). When the music feature model 415 receives acoustic features, the acoustic feature model 415 retrieves model parameters and maps the acoustic features to music features according to the model parameters. Using the music features that the music feature model 415 determines for candidate audio ads, the ad selector 335 selects one of the candidate audio ads according to a measure of musical similarity with music content delivered to the client device 110.

The music feature model trainer 420 determines the model parameters according to training data. The training data includes a set of audio content already associated with music features. For example, the training data are songs assigned music features by a musicologist (e.g., the songs in the data store 131). As another example, the training data are audio ads assigned music features by an advertiser 120 or musicologist. The music feature model trainer 420 obtains acoustic features for the audio content in the training data (from the acoustic feature identifier 410). The music feature model trainer 420 then determines the model parameters that predict the music features associated with the audio content using the obtained acoustic parameters. For example, the music feature model trainer 420 determines an objective function indicating the degree to which the music feature model 415 outputs music features matching the music features indicated in the training data. The music feature model trainer 420 modifies the parameters to optimize the objective function, thereby reducing differences between predicted music features and actual music features. The music feature model trainer 420 may use any number of artificial intelligence or machine learning techniques to modify the model parameters, including gradient tree boosting, logistic regression, neural network training, and deep learning. The music feature model trainer 420 stores the determined model parameters for use by the machine learning model 415.

The music feature model trainer 420 may train different model types to predict a music feature and then select one of the model types for use in the music feature model 415 for that music feature. For example, the music feature model trainer 420 compares objective functions determined over the training data for a trained decision tree and a trained logistic classifier. According to the comparison, the music feature model trainer 420 selects the model type that better predicts music features for the training data.

The model feedback engine 425 updates model parameters of the music feature model 415 according to feedback data received from client devices 110. Users are more likely to remain engaged with an audio ad when it musically matches the preceding audio content, so positive feedback indicates that the music model 415 is working well, and negative feedback indicates that the music model 415 could be improved. In one embodiment, the model feedback engine 425 coordinates differential tests to modify the model parameters. The model feedback engine 425 generates two or more different music feature models 415 having different model parameters. For example, one music feature model 415 is a model determined by the music feature model trainer, and a second music feature model 415 is determined by randomly adjusting one or more of the first model's parameters. The model feedback engine 425 uses the different music feature models 415 for different subsets of impression opportunities. An impression opportunity occurs when an audio ad is selected for presentation through a client device 110. The model feedback engine 425 aggregates feedback data for the different subsets of impression opportunities and selects one of the music feature models 415 according to the aggregated feedback data. For example, the model feedback engine 425 determines feedback scores (as described with respect to the ad selector 335) for the different sets of impression opportunities and selects the music feature model 415 with a higher feedback score. The model feedback engine 425 then stores the parameters of the selected music feature model 415 for subsequent use.

Alternatively or additionally to updating model parameters, the model feedback engine 425 may modify weights that the feature comparator 330 uses to calculate the measure of similarity between a candidate audio ad and reference audio content. The model feedback engine 425 generates two or more sets of weights corresponding to the different music features. The model feedback engine 425 then uses the different sets of weights to determine measures of similarity for different sets of impression opportunities and aggregates feedback data for the different subsets of impression opportunities. The model feedback engine 425 selects one set of weights according to the aggregated feedback data, which become the updated weights used by the feature comparator 330. For example, the model feedback engine 425 selects the set of weights corresponding to the set of impression opportunities with the highest feedback score.

Providing a Personalized Audio Advertisement

Figure 5:
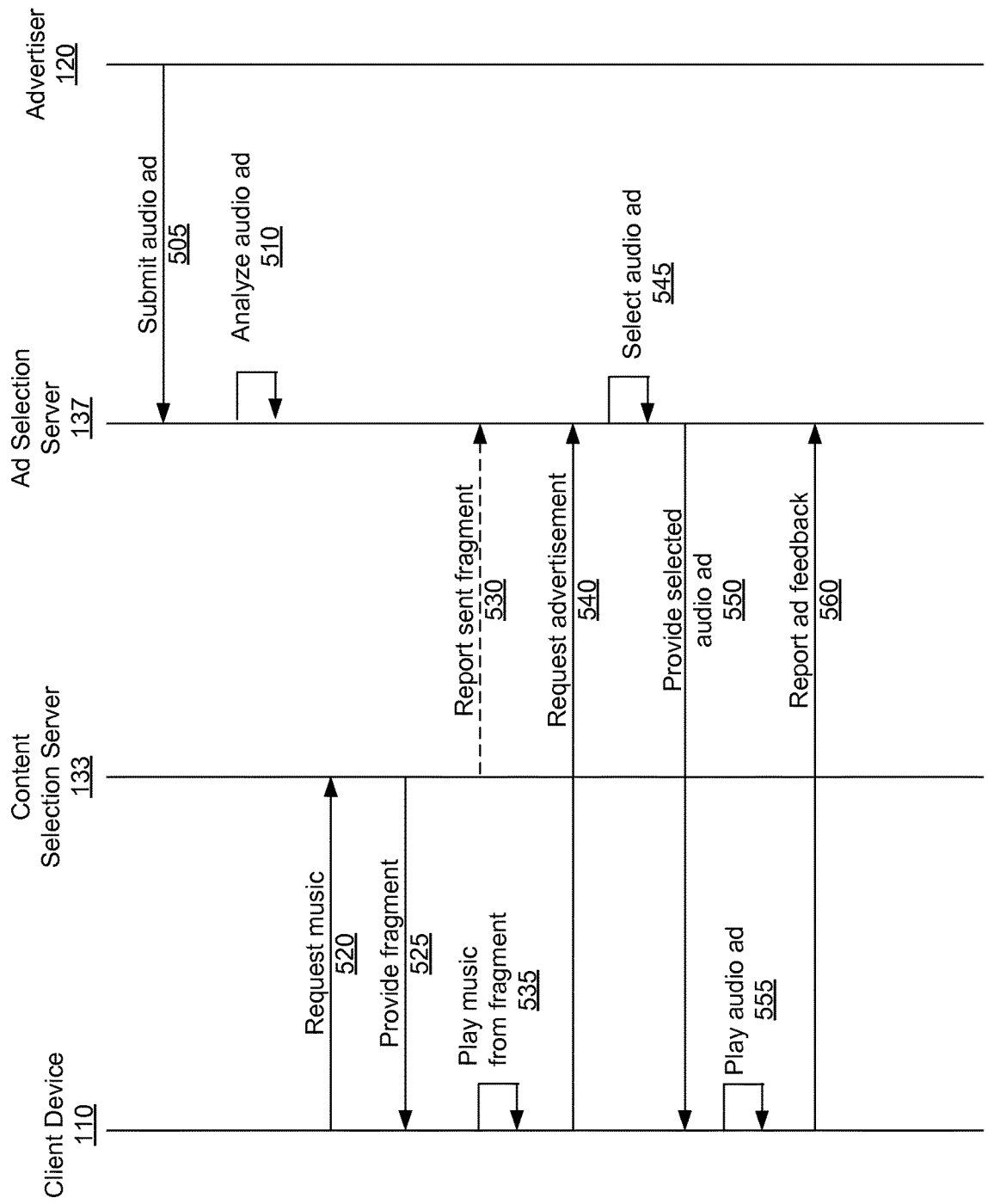
FIG. 5 is a sequence diagram illustrating interactions between the client device, content server, and advertiser, according to an embodiment.

FIG. 5 is a sequence diagram illustrating interactions between the client device 110, advertiser 120, and content server 130, according to an embodiment. The advertiser 120 submits 505 ad information that includes an audio ad to the ad selection server 137. For example, the ad information includes targeting criteria or other advertiser preferences. The ad selection server 137 analyzes 510 the audio ad to determine associated music features, as described further with respect to FIGS. 4 and 7.

The client device 110 requests 520 music or other audio content. For example, the client device 110 requests 520 to initiate a streaming session in response to a user input or in response to having less than a threshold amount of audio content stored in the fragment store 240. The music selection server 133 selects audio content and provides 525 the fragment comprising audio content. The music selection server 133 reports 530 audio content in the fragment to the ad selection server 137 for use in selecting ads for presentation during or after audio content in the fragment.

The client device requests 540 an audio ad for playback immediately after reference audio content. Alternatively or additionally to the music selection server 133 reporting 530 the audio content to the ad selection server 137, the ad request indicates the audio content immediately preceding or otherwise temporally proximate to the audio ad. The ad selection server 137 selects 545 the audio based on the reference audio content and provides 550 the selected audio ad to the client device 110. Instead of selecting 545 the audio ad in response to a request 540 for an audio ad, the ad selection server 137 selects 545 the audio ad in response to a request 520 for music or other audio content and provides 550 the audio ad with the audio content provided 525 in the fragment.

The client device 110 plays 555 the audio ad immediately after or otherwise in temporal proximity to the reference audio content. The client device reports 560 feedback data to the ad selection server 137 (for selecting audio ads) and/or to the music selection server 133 (for updating user music preferences).

Presenting an Audio Ad Selected According to Inferred Music Features

Figure 6:
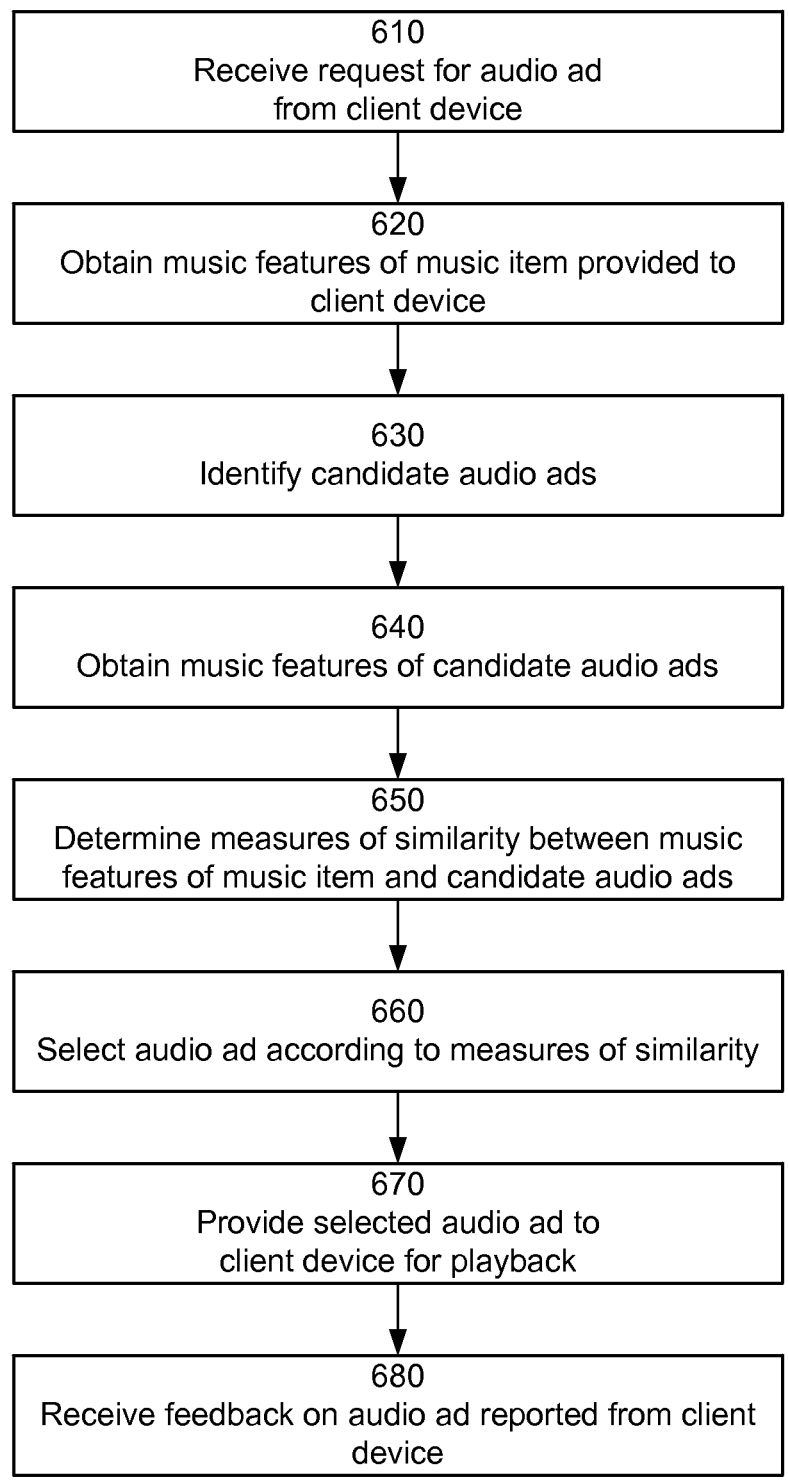
FIG. 6 is a flowchart illustrating an example process for selecting an audio advertisement similar to music provided to a client device, according to an embodiment.

FIG. 6 is a flowchart illustrating an example process for selecting an audio advertisement similar to music provided to a client device, according to an embodiment. Other entities may perform some or all of the steps of the process in other embodiments. Likewise, embodiments may include different and/or additional steps, or perform the steps in different orders. Although described with respect to serving an audio ad in a stream of music items, the process described herein may be used to serve an audio ad before, during, or after other audio content, whether streamed, downloaded, or otherwise provided to the client device 110.

The content server 130 receives 610 a request for an audio ad from a client device 110. For example, the request is part of a request for music content, or the request occurs when the client device 110 encounters a slot reserved for an audio ad in a fragment of audio content.

The content server 130 obtains 620 music features of a reference music item provided to the client device (e.g., from the data store 131). For example, the reference music item is a song played immediately before the audio ad, but the reference music item may be another music item played in temporal proximity to the selected audio ad.

The content server 130 identifies 630 candidate audio ads (e.g., by the ad filter 320). For example, the content server 130 identifies the candidate audio ads by filtering a database of audio ads according to whether the ad impression opportunity matches targeting criteria associated with the audio ads. For example, if the content server 130 is providing the client device 110 music items from a particular genre, then the candidate audio ads include audio ads specifying that genre as a targeting criterion.

The content server 130 obtains 640 music features associated with the candidate audio ads. For example, the ad analyzer 305 determines the music features associated with the candidate audio ads and stores the music features associated with the ad in the data store 131. The music feature summarizer 325 obtains 640 the associated music features from the data store 131 and generates a coordinate representing the music features associated with a candidate audio ad to facilitate comparison with the reference music item. The music features in the data store 131 may be determined by the ad analyzer 305 according to a music feature model 415. Training and use of the music feature model 415 is described further with respect to FIG. 7.

The content server 130 determines 650 measures of similarity between the music features associated with the reference item and the respective music features of the candidate audio ads (e.g., by the feature comparator 330). For example, the measure of similarity depends on the cosine distance or linear distance between a candidate ad coordinate representing a candidate audio ad and a reference coordinate representing the reference music item. As another example, the measure of similarity depends on a weighted combination of those music features in common between the candidate audio ad and the reference music item.

The content server 130 selects 660 the audio ad according to the measures of similarity (e.g., by the ad selector 335). For example, the ad selector 335 ranks the candidate audio ads according to scores and selects 660 one of the candidate audio ads according to the scores. The score for a candidate audio ad includes the measure of similarity between the candidate audio ad and the reference music item, but it may also include other scores determined from other user information gathered by the user information collector 310. For example, the score for a candidate audio ad is a combination of the measure of similarity with a feedback score indicating how likely the user is to respond positively or negatively to the audio ad according to the user's feedback to other audio content having music features similar to those in the audio ad.

The content server 130 provides 670 the selected audio ad to the client device 110 for playback through the application 215. For example, the client device 110 presents the audio ad immediately after the reference music item used to select the audio ad.

Determining Music Features from Acoustic Features

Figure 7:
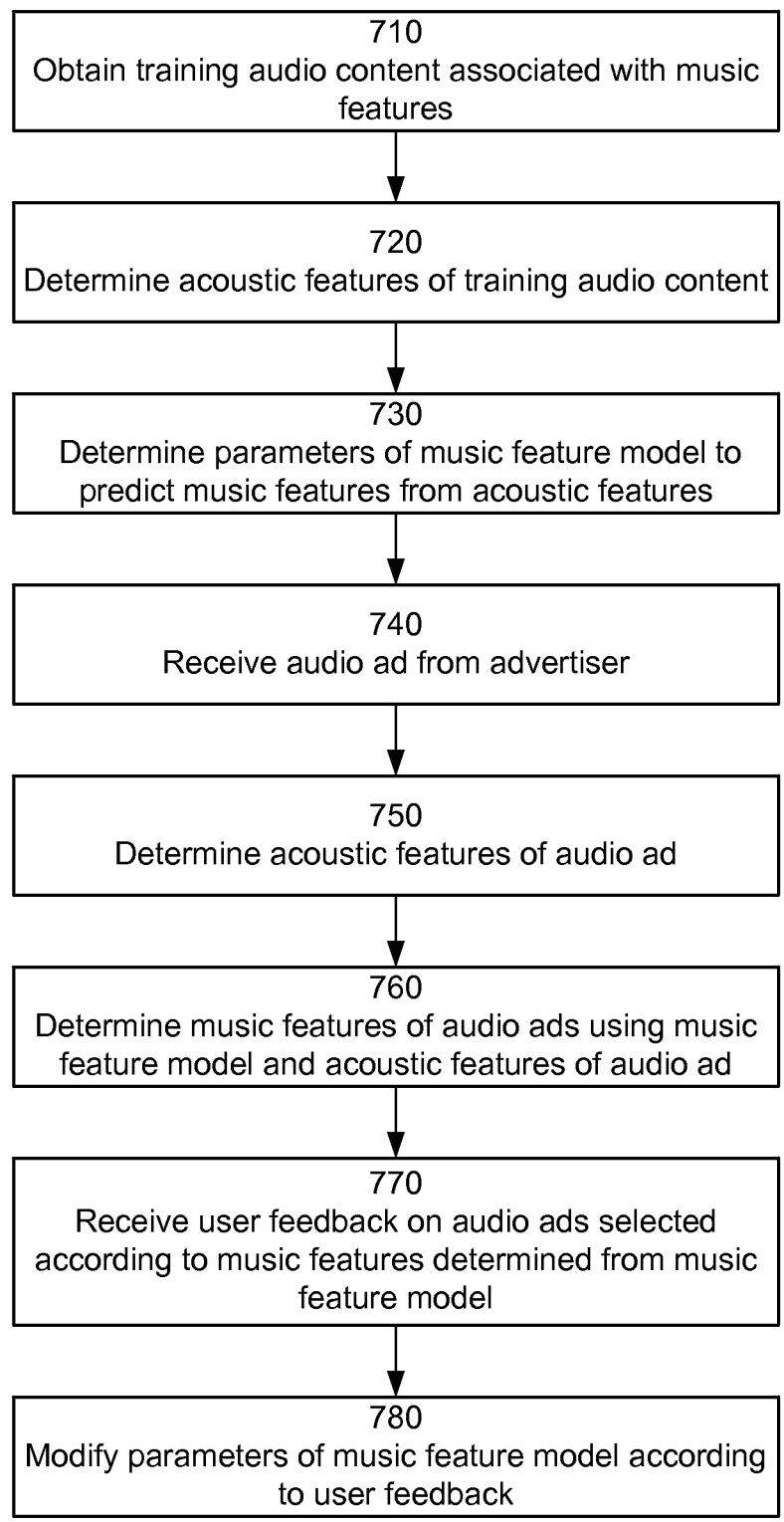
FIG. 7 is a flowchart illustrating an example process for configuring a music feature model that predicts music features from acoustic features, according to an embodiment.

FIG. 7 is a flowchart illustrating an example process for configuring a music feature model that predicts music features from acoustic features, according to an embodiment. Other entities may perform some or all of the steps of the process in other embodiments. Likewise, embodiments may include different and/or additional steps, or perform the steps in different orders.

The content server 130 obtains 710 training data comprising training audio content and music features associated with the training audio content (e.g., from the data store 131). For example, the audio content are music items assigned music features by a musicologist. As another example, the training audio content includes audio ads assigned music features by an advertiser 120 or musicologist.

The content server 130 determines 720 acoustic features of training audio content (e.g., by the acoustic feature identifier 405) in the training data. Example acoustic features include frequency spectrums indicating pitches in music, MFCCs corresponding to timbre in music, and temporal autocorrelation coefficients indicating tempo or meter.

The content server 130 determines 730 model parameters of the music feature model 415 to predict the music features associated with the training audio content (e.g., by the music model trainer 420). For example, the music feature model 415 determines 730 the model parameters to optimize an objective function that measure the likelihood of the music feature model 415 to correctly predict music features of the training audio content. The particular training method may vary with the one or more models in the music feature model 415. For example, logistic regression is used to train a logistic classifier, and gradient tree boosting may be used to train a decision tree. If the music feature model 415 includes multiple models, determining 730 the model parameters may include determining how to combine results of the multiple models. For example, the music model trainer 420 determines to use one model for one subset of music features, another model for another subset of music features, and a combination of the models for a third subset of music features (e.g., combined using a Boolean expression).

The content server 130 receives 740 an audio ad from an advertiser 120. The content server 130 determines 750 acoustic features of the audio ad (e.g., by the acoustic feature identifier 405). The content server 130 determines 760 music features of the audio ad using the acoustic features of the audio ad as input to the music feature model 415. The content server 130 stores the determine music features in association with the audio ad in the data store 131.

Subsequently, the content server 130 receives 770 feedback on audio ads selected according to music features determined from the music feature model 415 (e.g., by the reporting module 250 and the user information collector 310). The content server 130 modifies 780 the model parameters of the music feature model 415 according to the feedback data (e.g., by the model feedback engine 425). For example, the model feedback engine 425 conducts alpha-beta tests (A/B tests) for different sets of model parameters and selects the set of model parameters receiving more positive (and less negative) feedback data in the A/B tests.

Computer

Figure 8:
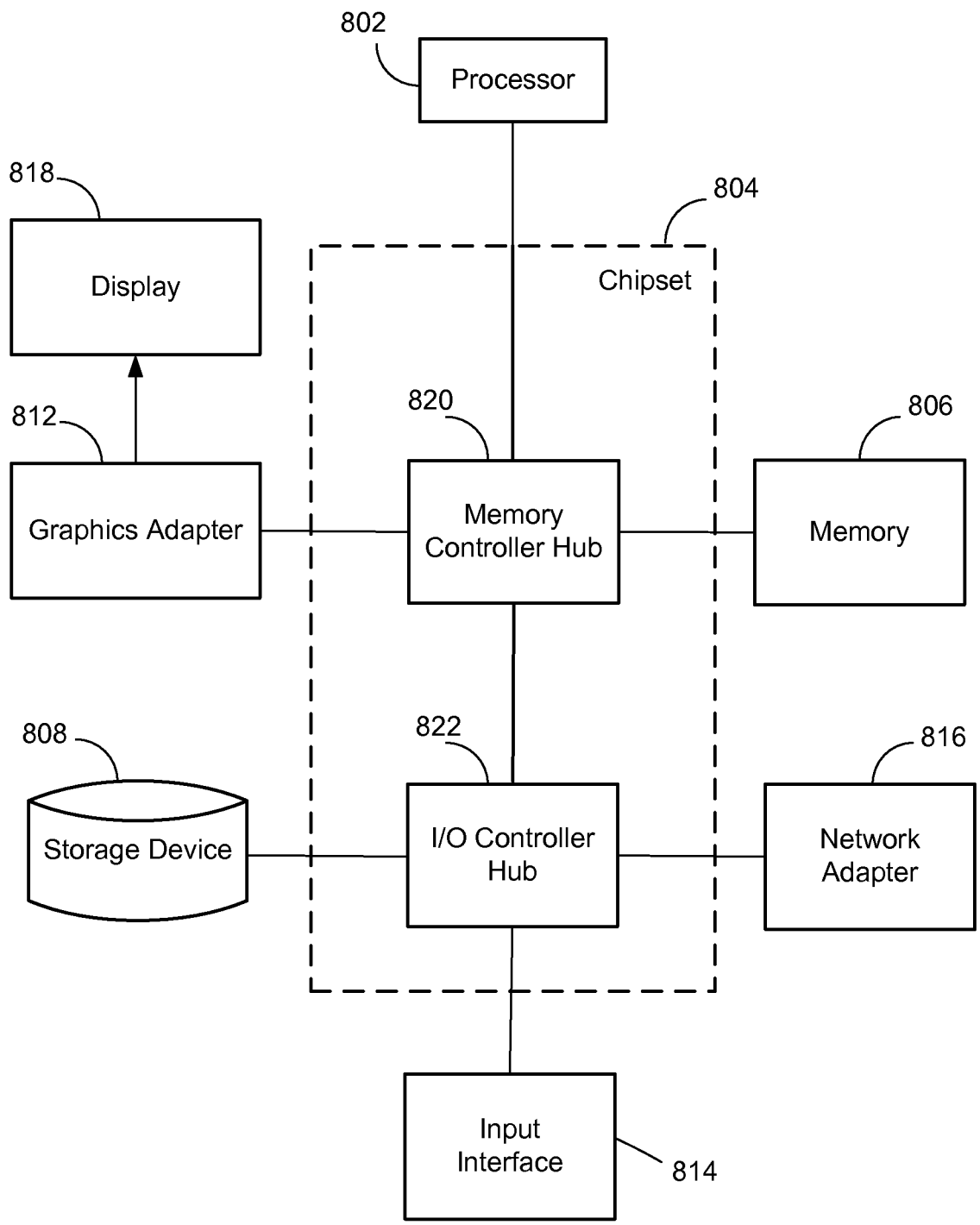
FIG. 8 is a high-level block diagram illustrating an example computer for implementing the entities shown in FIG. 1, according to an embodiment.

FIG. 8 is a high-level block diagram illustrating an example computer 800 for implementing the entities shown in FIG. 1, according to an embodiment. The computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, an input interface 814, a network adapter 816, and an audio output device 824 are coupled to the I/O controller hub 822. Other embodiments of the computer 800 have different architectures.

The storage device 808 is a non-transitory computer-readable storage medium such as a hard drive, compact disk read-only memory (CD-ROM), DVD, or a solid-state memory device. The memory 806 holds instructions and data used by the processor 802. The input interface 814 is a touch-screen interface, a mouse, track ball, or other type of pointing device, a keyboard, or some combination thereof, and is used to input data into the computer 800. In some embodiments, the computer 800 may be configured to receive input (e.g., commands) from the input interface 814 via gestures from the user. The graphics adapter 812 displays images and other information (e.g., the user interface 220) on the display 818. The network adapter 816 couples the computer 800 to one or more computer networks 140. In one embodiment, the display 818 and input interface 814 are combined as a touch-sensitive display (e.g., a touch screen), which detects gestures (e.g., scrolling, tapping, swiping, pinching, stretching). The audio output device 824 produces audible sound waves from electrical signals, such a musical content or audio advertisements. The audio output device includes hardware to convert electrical signals to mechanical vibrations (e.g., a piezoelectric speaker, a dynamic loudspeaker) as well as accompanying electronic circuitry (e.g., an amplifier, a digital-to-analog converter).

The computer 800 is adapted to execute computer program modules for providing functionality described herein. As used herein, the term "module" refers to computer program logic used to provide the specified functionality. Thus, a module can be implemented in hardware, firmware, software, and/or a combination thereof. In one embodiment, program modules (e.g., the ad analyzer 305, the ad selector 335) are stored on the storage device 808, loaded into the memory 806, and executed by the processor 802.

The types of computers 800 used to implement the entities of FIG. 1 can vary depending upon the embodiment and the processing power required by the entity. For example, the client device 110 is a computer 800 such as a smart phone or a tablet. As another example, the content server 130 is one or more servers working together to provide the functionality described herein. A computer 800 (e.g., a server) may lack some of the components described above, such as a keyboard, a graphics adapter 812, and a display 818. Alternatively or additionally, the functionality of a computer 800 may be provided by multiple communicatively coupled devices. For example, the client device 110 is a tablet including many of the components of the computer 800 (e.g., the network adapter 816, the chipset 804, the processor 802) communicatively coupled with external audio output device 824 (e.g., a home sound system comprising multiple speakers).

Additional Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for selecting audio content with similar music features. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed herein.

What is claimed is:

1. A computer-implemented method for selecting an audio message similar to music provided to a client device, the method comprising:
receiving, from the client device, a seed indicating attributes of music items to provide to the client device;
providing a playlist containing a plurality of music items determined based on the seed to the client device;
receiving, from the client device, feedback describing preferences of a user of the client device with respect to one or more of the plurality of music items in the playlist provided to the client device;
obtaining an indication of a reference music item in the playlist presented by the client device, the reference music item next followed by a subsequent music item in the playlist;
obtaining reference music features describing musicological characteristics of the reference music item;
identifying candidate audio messages associated with candidate music features describing musicological characteristics of the candidate audio messages, each candidate audio message comprising a voiceover track and background music, wherein candidate music features of at least one of the candidate audio messages are obtained by:
   identifying the background music of the candidate audio message by comparing the candidate audio message to a database of music items;
   generating a musical approximation of the voiceover track by temporally aligning the identified background music and the candidate audio message and subtracting the identified background music from the candidate audio message;
   determining acoustic features quantitatively summarizing the voiceover track of the candidate audio message from the musical approximation of the voiceover track; and
   determining the candidate music features describing musicological characteristics of the voiceover track of the candidate audio message according to a music feature model comprising a plurality of model parameters for mapping an acoustic feature coordinate indicating values of the acoustic features to the candidate music features;
selecting, by a processor, a plurality of similar audio messages from the candidate audio messages according to measures of similarity between the candidate music features of the voiceover track of the candidate audio messages and the reference music features of the reference music item;
ranking the plurality of similar audio messages based on preferences of the user with respect to the candidate music features of the plurality of similar audio messages;
selecting an audio message for playback to the user based on the ranking of the plurality of similar audio messages; and inserting the selected audio message into the playlist between the reference music item and the subsequent music item.

2. The method of claim 1, wherein selecting the plurality of similar audio messages according to the measures of similarity comprises:
obtaining a reference coordinate representing the reference music features of the reference music item;
obtaining candidate coordinates representing the candidate music features of the voiceover tracks of the candidate audio messages;
determining scores for the candidate audio messages by determining a measure of similarity between the reference coordinates and each of the candidate coordinates based at least in part on weights determined responsive to the feedback describing preferences of the user with respect to one or more of the plurality of music items in the playlist provided to the client device; and
selecting the selected audio message responsive to the scores for the candidate audio messages.

3. The method of claim 2, wherein obtaining the reference coordinate comprises:
obtaining a plurality of reference coordinates representing music features of respective reference music items; and
generating the reference coordinate by combining the plurality of reference coordinates.

4. The method of claim 1, wherein the music feature model mapping the acoustic features to the music features is obtained by performing steps comprising:
determining training acoustic features quantitatively describing training music items associated with training music features; and
determining the parameters of the music feature model according to a measure of the music feature model's ability to predict the training music features from the training acoustic features.

5. The method of claim 1, further comprising:
selecting audio messages for different sets of impression opportunities according to a plurality of different music features models;
providing the selected audio messages to a plurality of client devices providing the different sets of impression opportunities;
receiving feedback from the client devices indicating actions taken by users of the client devices in response to the client devices presenting the audio messages; and
selecting one of the different music feature models as the music feature model according to summaries of feedback received for the different sets of impression opportunities.

6. The method of claim 1, wherein selecting the plurality of similar audio messages from the candidate audio messages comprises:
receiving feedback data from the client device describing user interactions with formerly presented audio messages;
for a candidate audio message:
determining measures of similarity between candidate music features of the voiceover track of the candidate audio message and music features of the formerly presented audio messages; and
determining a feedback score by combining the measures of similarity according to weights corresponding to a type of feedback received for each formerly presented audio message; and
selecting at least one of the candidate audio messages according to a combination of the determined feedback scores and the measures of similarity between the candidate music features of the voiceover tracks of the candidate audio messages and the reference music features of the reference music item.

7. A non-transitory computer-readable storage medium storing computer program instructions executable by a processor, the instructions executable to perform operations comprising:
receiving, from a client device, a seed indicating attributes of music items to provide to the client device;
providing a playlist containing a plurality of music items determined based on the seed to the client device;
receiving, from the client device, feedback describing preferences of a user of the client device with respect to one or more of the plurality of music items in the playlist provided to the client device;
obtaining an indication of a reference music item in the playlist presented by the client device, the reference music item next followed by a subsequent music item in the playlist;
obtaining reference music features describing musicological characteristics of the reference music item;
identifying candidate audio messages associated with candidate music features describing musicological characteristics of the candidate audio messages, each candidate audio message comprising a voiceover track and background music, wherein candidate music features of at least one of the candidate audio messages are obtained by:
identifying the background music of the candidate audio message by comparing the candidate audio message to a database of music items;
generating a musical approximation of the voiceover track by temporally aligning the identified background music and the candidate audio message and subtracting the identified background music from the candidate audio message;
determining acoustic features quantitatively summarizing the voiceover track of the candidate audio message from the musical approximation of the voiceover track; and
determining the candidate music features describing musicological characteristics of the voiceover track of the candidate audio message according to a music feature model comprising a plurality of model parameters for mapping an acoustic feature coordinate indicating values of the acoustic features to the candidate music features;
selecting a plurality of similar audio messages from the candidate audio messages according to measures of similarity between the candidate music features of the voiceover track of the candidate audio messages and the reference music features of the reference music item;
ranking the plurality of similar audio messages based on preferences of the user with respect to the candidate music features of the plurality of similar audio messages;
selecting an audio message for playback to the user based on the ranking of the plurality of similar audio messages; and
inserting the selected audio message into the playlist between the reference music item and the subsequent music item.

8. The computer-readable medium of claim 7, wherein selecting the plurality of similar audio messages according to the measures of similarity comprises:

obtaining a reference coordinate representing the reference music features of the reference music item;
obtaining candidate coordinates representing the candidate music features of the voiceover tracks of the candidate audio messages;
determining scores for the candidate audio messages by determining a measure of similarity between the reference coordinates and each of the candidate coordinates based at least in part on weights determined responsive to the feedback describing preferences of the user with respect to one or more of the plurality of music items in the playlist provided to the client device; and
selecting at least one selected audio message responsive to the scores for the candidate audio messages.

9. The computer-readable medium of claim 8, wherein obtaining the reference coordinate comprises:
obtaining a plurality of reference coordinates representing music features of respective reference music items; and
generating the reference coordinate by combining the plurality of reference coordinates.

10. The computer-readable medium of claim 7, wherein selecting the plurality of similar audio messages from the candidate audio messages comprises:
receiving feedback data from the client device describing user interactions with formerly presented audio messages;
for a candidate audio message:
determining measures of similarity between candidate music features of the voiceover track of the candidate audio message and music features of the formerly presented audio messages; and
determining a feedback score by combining the measures of similarity according to weights corresponding to a type of feedback received for each formerly presented audio message; and
selecting at least one of the candidate audio messages according to a combination of the determined feedback scores and the measures of similarity between the candidate music features of the voiceover tracks of the candidate audio messages and the reference music features of the reference music item.

11. A system for selecting an audio message similar to music provided to a client device, the system comprising:
a processor; and
a non-transitory computer-readable storage medium storing computer program instructions executable by the processor, the instructions executable to perform operations comprising:
receiving, from the client device, a seed indicating attributes of music items to provide to the client device;
providing a playlist containing a plurality of music items determined based on the seed to the client device;
receiving, from the client device, feedback describing preferences of a user of the client device with respect to one or more of the plurality of music items in the playlist provided to the client device;
obtaining an indication of a reference music item in the playlist presented by the client device, the reference music item next followed by a subsequent music item;
obtaining reference music features describing musicological characteristics of the reference music item;
identifying candidate audio messages associated with candidate music features describing musicological characteristics of the candidate audio messages, each candidate audio message comprising a voiceover track and background music, wherein candidate music features of at least one of the candidate audio messages are obtained by:
identifying the background music of the candidate audio message by comparing the candidate audio message to a database of music items;
generating a musical approximation of the voiceover track by temporally aligning the identified background music and the candidate audio message and subtracting the identified background music from the candidate audio message;
determining acoustic features quantitatively summarizing the voiceover track of the candidate audio message from the musical approximation of the voiceover track; and
determining the candidate music features describing musicological characteristics of the voiceover track of the candidate audio message according to a music feature model comprising a plurality of model parameters for mapping an acoustic feature coordinate indicating values of the acoustic features to the candidate music features;
selecting a plurality of similar audio messages from the candidate audio messages according to measures of similarity between the voiceover track of the candidate music features of the candidate audio messages and the reference music features of the reference music item;
ranking the plurality of similar audio messages based on preferences of the user with respect to the candidate music features of the plurality of similar audio messages;
selecting an audio message for playback to the user based on the ranking of the plurality of similar audio messages; and
inserting the selected audio message into the playlist between the reference music item and the subsequent music item.

12. The system of claim 11, wherein selecting the plurality of similar audio messages according to the measures of similarity comprises:
obtaining a reference coordinate representing the reference music features of the reference music item;
obtaining candidate coordinates representing the candidate music features of the voiceover tracks of the candidate audio messages;
determining scores for the candidate audio messages by determining a measure of similarity between the reference coordinates and each of the candidate coordinates based at least in part on weights determined responsive to the feedback describing preferences of the user with respect to one or more of the plurality of music items in the playlist provided to the client device; and
selecting at least one selected audio message responsive to the scores for the candidate audio messages.

13. The system of claim 12, wherein obtaining the reference coordinate comprises:
obtaining a plurality of reference coordinates representing music features of respective reference music items; and
generating the reference coordinate by combining the plurality of reference coordinates.

14. The system of claim 11, wherein selecting the plurality of similar audio messages from the candidate audio messages comprises:

receiving feedback data from the client device describing user interactions with formerly presented audio messages;

for a candidate audio message:
  determining measures of similarity between candidate music features of the voiceover track of the candidate audio message and music features of the formerly presented audio messages; and
  determining a feedback score by combining the measures of similarity according to weights corresponding to a type of feedback received for each formerly presented audio message; and selecting at least one of the candidate audio messages according to a combination of the determined feedback scores and the measures of similarity between the candidate music features of the voiceover tracks of the candidate audio messages and the reference music features of the reference music item.

15. The method of claim 1, wherein the feedback comprises feedback with respect to a plurality of the music items in the playlist.

* * * * *